(12) United States Patent
Pietkiewicz

(10) Patent No.: US 9,153,376 B2
(45) Date of Patent: Oct. 6, 2015

(54) HARMONIC CANCELLING INTERPHASE MAGNETIC DEVICE

(71) Applicant: Schaffner EMV AG, Luterbach (CH)

(72) Inventor: Andrzej Pietkiewicz, Burgdorf (CH)

(73) Assignee: Schaffner EMV AG (CH)

( * ) Notice: Subject to any disclaimer, the term of this patent is extended or adjusted under 35 U.S.C. 154(b) by 552 days.

(21) Appl. No.: 13/667,818

(22) Filed: Nov. 2, 2012

(65) Prior Publication Data

US 2013/0121043 A1   May 16, 2013

Related U.S. Application Data

(63) Continuation of application No. PCT/EP2010/058157, filed on Jun. 10, 2010.

(51) Int. Cl.

| | |
|---|---|
| *H01F 37/00* | (2006.01) |
| *H02M 1/12* | (2006.01) |
| *H02M 7/06* | (2006.01) |
| *H01F 27/33* | (2006.01) |
| *H01F 30/12* | (2006.01) |
| *H01B 7/30* | (2006.01) |
| *H01F 38/02* | (2006.01) |
| *H02M 7/217* | (2006.01) |
| *H02M 7/493* | (2007.01) |

(52) U.S. Cl.
CPC ............... *H01F 37/00* (2013.01); *H01F 27/33* (2013.01); *H01F 30/12* (2013.01); *H02M 1/12* (2013.01); *H02M 1/126* (2013.01); *H02M 7/06* (2013.01); *H01F 2038/026* (2013.01); *H02M 7/2173* (2013.01); *H02M 7/493* (2013.01)

(58) Field of Classification Search
USPC .......................................................... 307/147
See application file for complete search history.

(56) References Cited

U.S. PATENT DOCUMENTS

2003/0206087 A1   11/2003   Raff

FOREIGN PATENT DOCUMENTS

| GB | 507775 | 6/1939 |
|---|---|---|
| JP | 2000358372 A | 12/2000 |
| JP | 2007028846 A | 2/2007 |
| WO | WO-9819385 A1 | 5/1998 |

*Primary Examiner* — Robert Deberadinis
(74) *Attorney, Agent, or Firm* — Blank Rome LLP

(57) ABSTRACT

A harmonic cancelling interphase magnetic device (1) comprising a magnetic core of rectangular shape with three wound legs (14) and two non-wound legs (12), wherein the cross-section of said non-wound legs (12) is thinner than the cross-section of said wound legs (14). The magnetic device is designed for a front end multi-pulse rectifier or inverter. Its use enables reduction of the harmonics of the currents absorbed or injected to three-phase power line. Compare to known solutions, cost, material and dimensions of the magnetic device are significantly reduced.

18 Claims, 22 Drawing Sheets

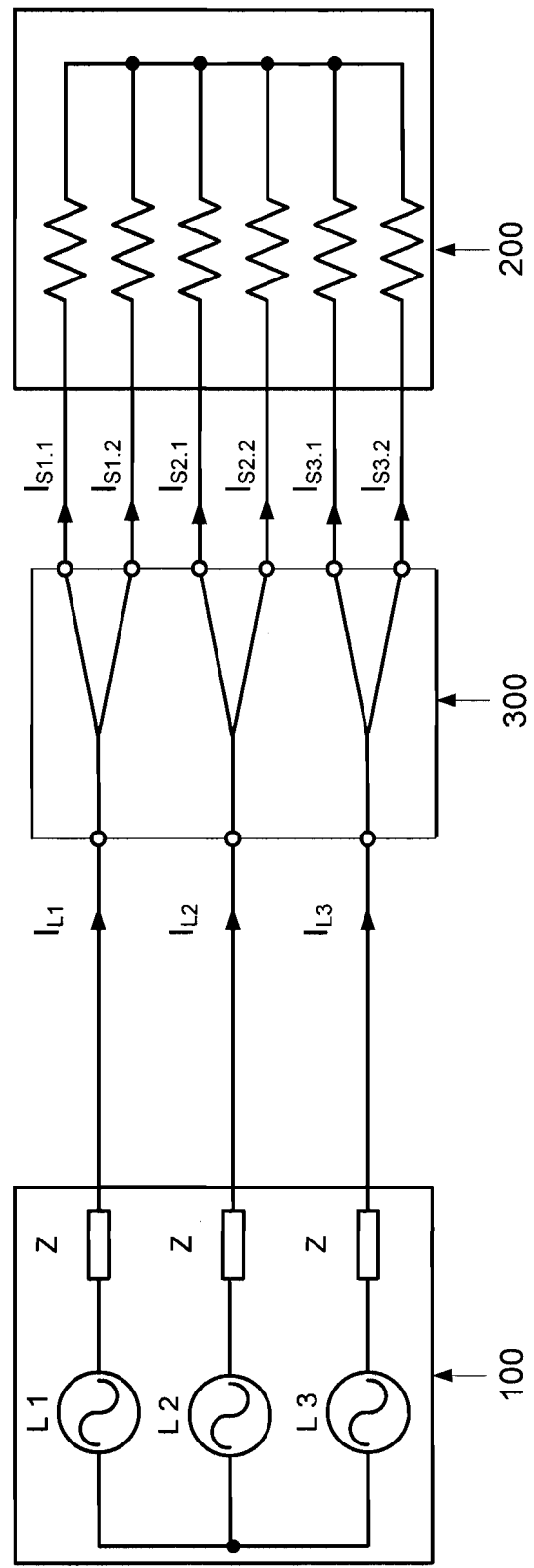

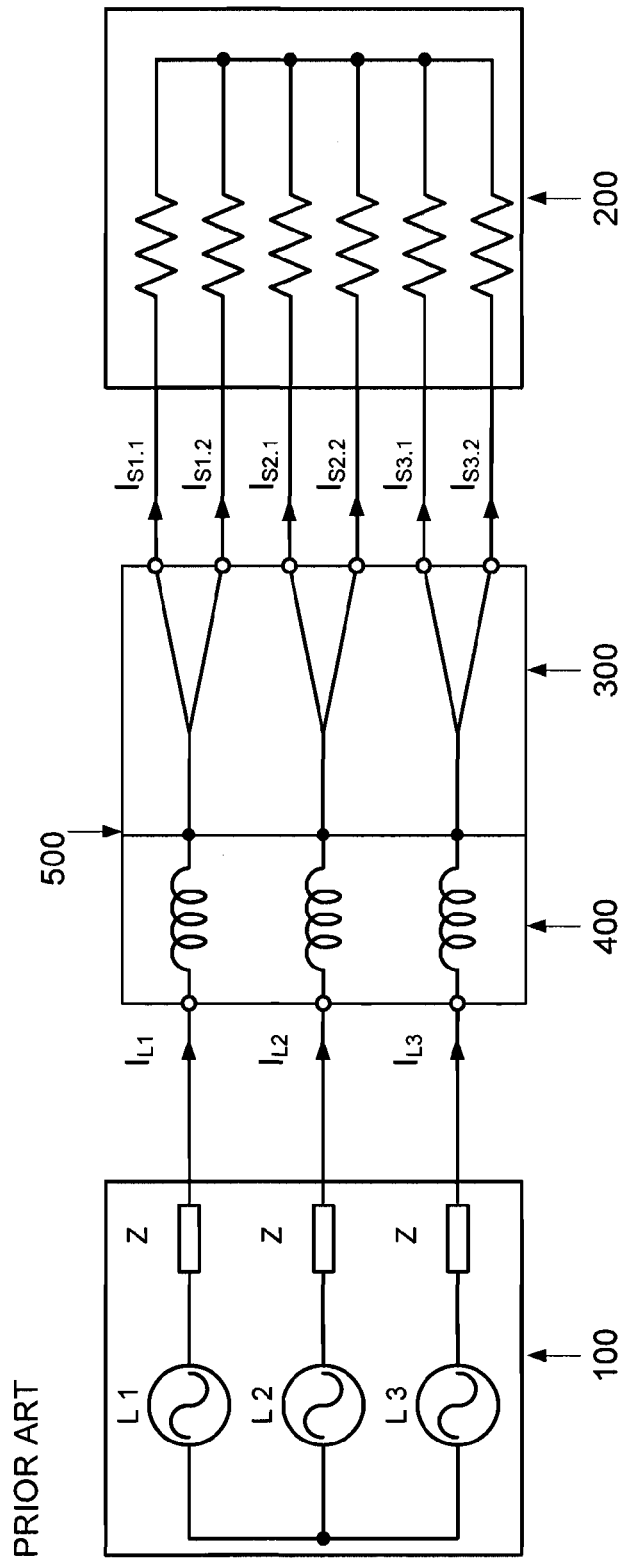

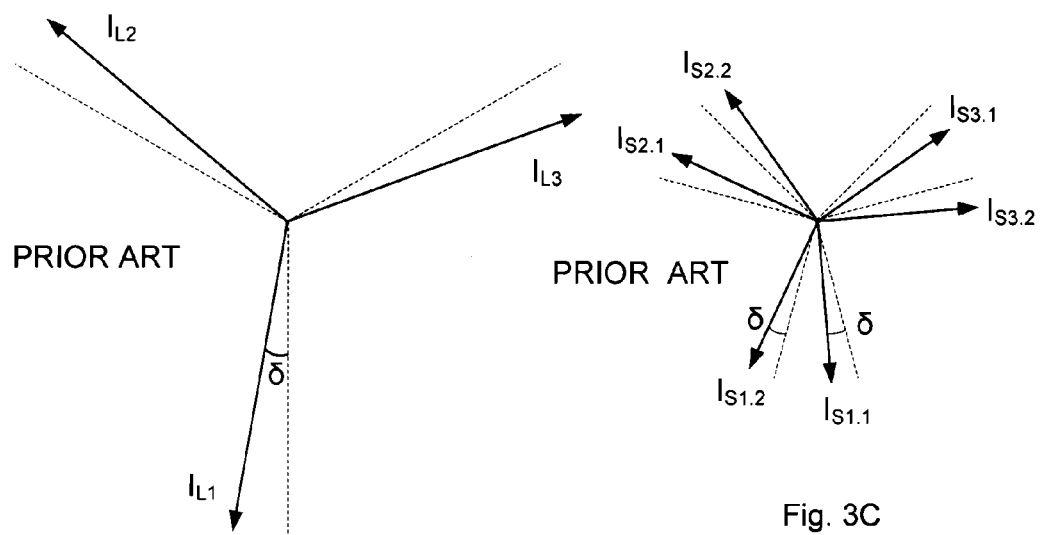
Fig. 3B
Fig. 3C
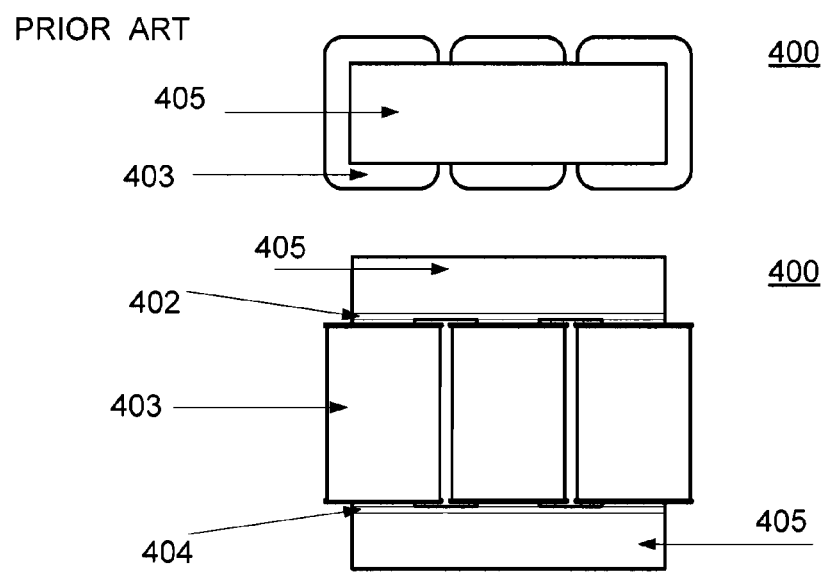
Fig. 4

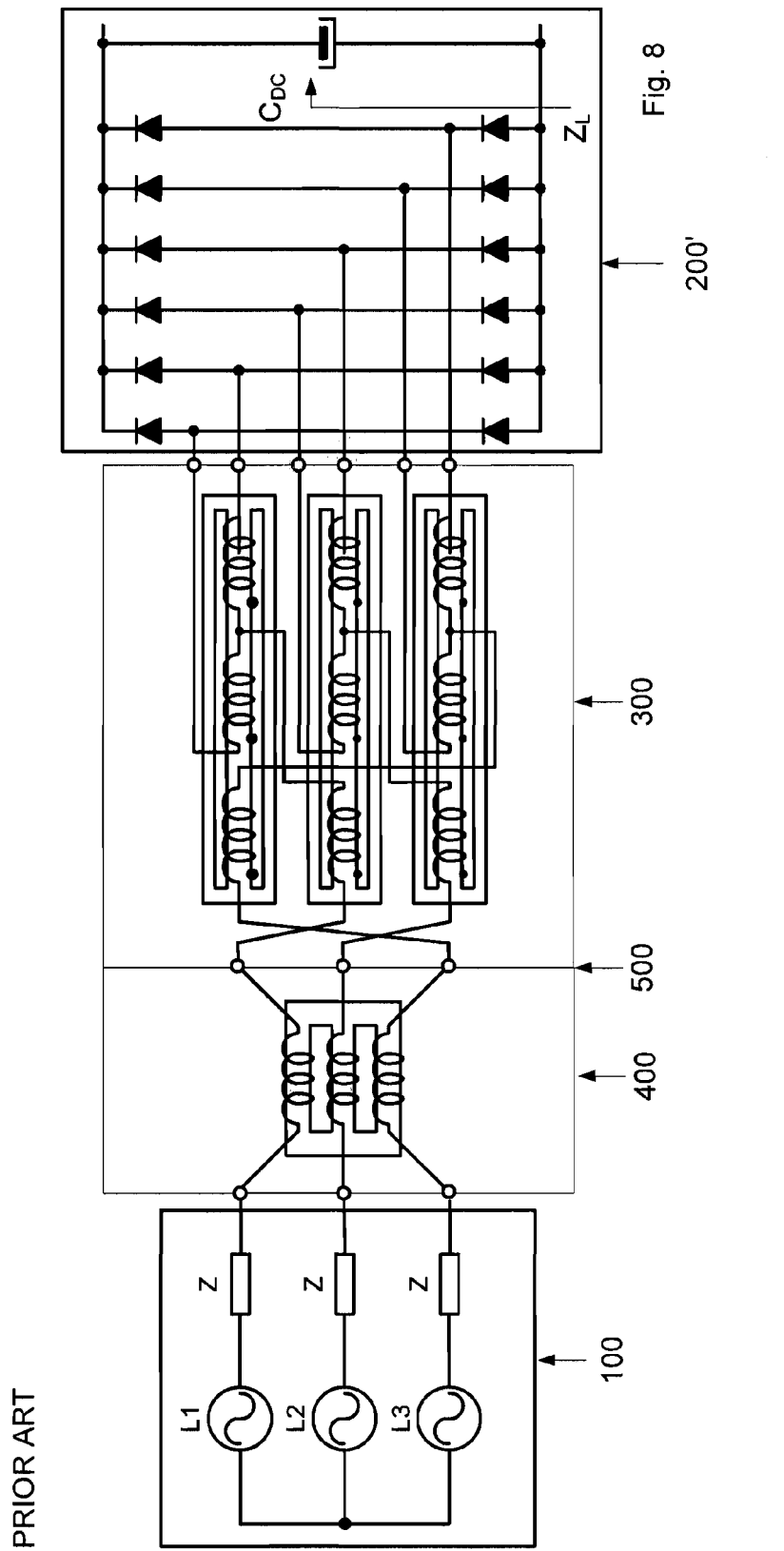
PRIOR ART

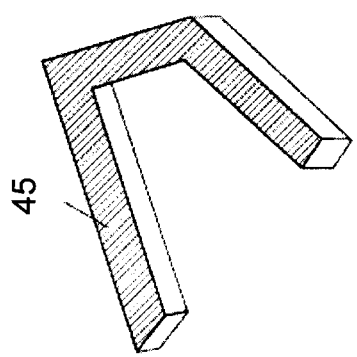
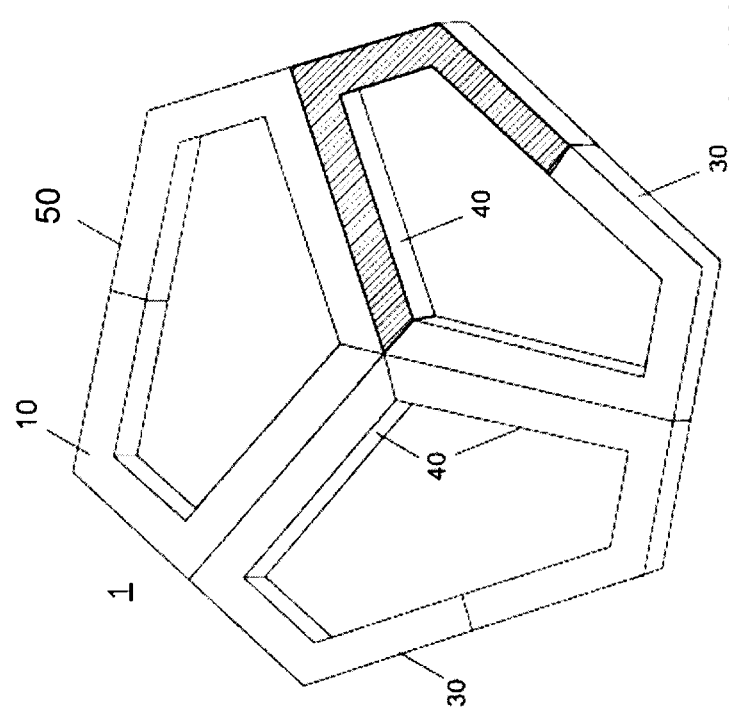

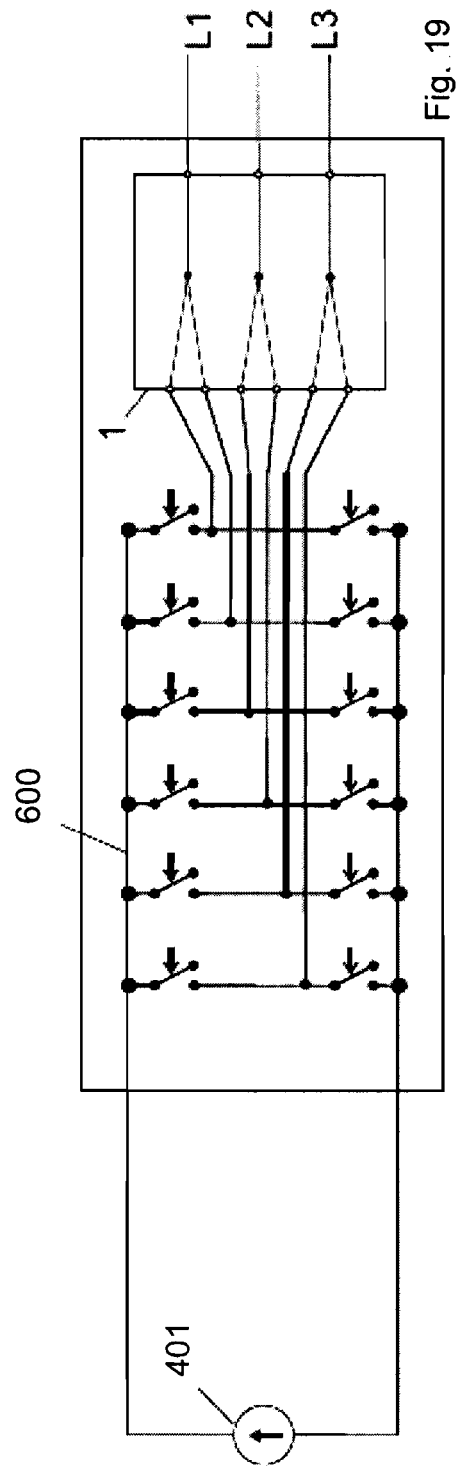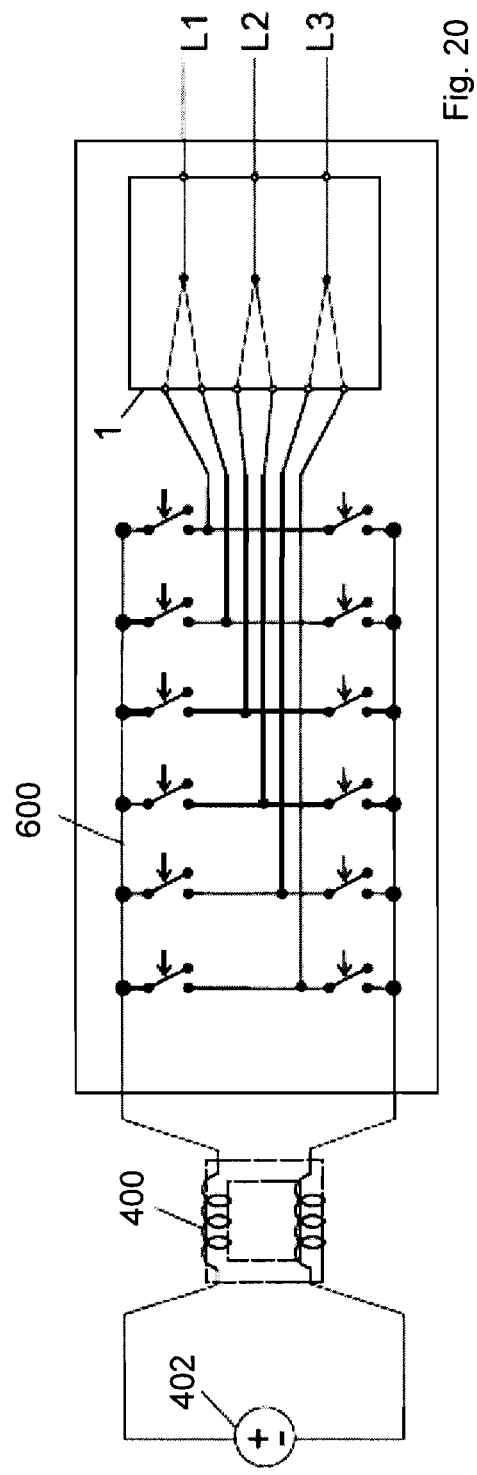

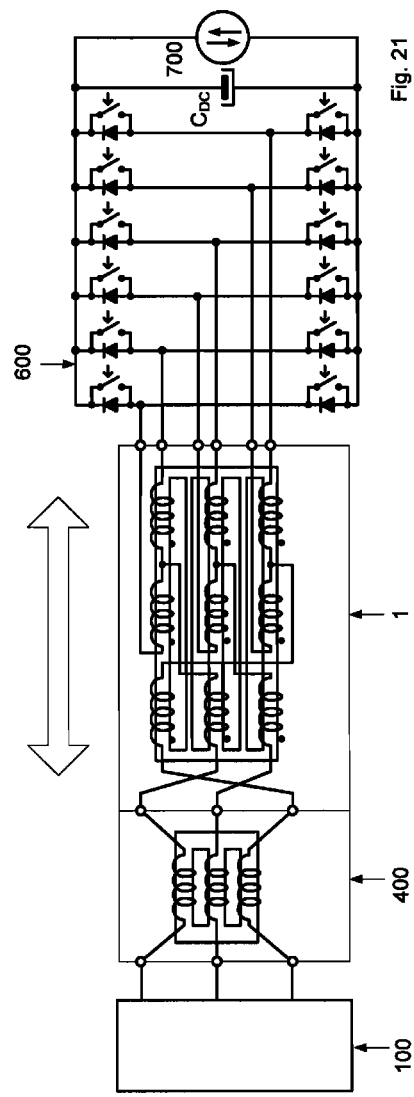

HARMONIC CANCELLING INTERPHASE MAGNETIC DEVICE

REFERENCE DATA

This application is a continuation of International Patent Application PCT/EP2010/058157 (WO2011154040) filed on Jun. 10, 2010, the contents whereof are hereby incorporated by reference.

FIELD OF THE INVENTION

Embodiments of the present invention concern a harmonic cancelling interphase magnetic device for a low harmonic AC/DC and DC/AC converter, and bidirectional front-end including such device.

DESCRIPTION OF PRIOR ART

The widespread use of power electronic equipment has increased the need of minimization of power lines harmonic pollution. Main source of current harmonics are non-linear power loads. An important non-linear power load is the six-pulse rectifier, which is widely used as a front-end solution for the majority of the three-phase equipments.

If there is not an efficient minimization of the current harmonics, some problems can occur. First, harmonics can destroy the quality of public power supply voltage and a low quality of the supply voltage causes malfunction and/or failure of many different kinds of electrical equipment supplied by the public power grid. Moreover harmonics can cause excessive losses in the components of the power grid such as transformers, power lines, etc. Further, harmonics have audible frequencies: if the power line polluted by harmonics is in the vicinity of an audible equipment installation, an audible distortion can be induced.

Different solutions have been used in the prior art to cope with the harmonics' problem. Multi-pulse rectifiers, i.e. a 12-pulse, are widely used as a simple interface with improved current waveforms. They reduce the harmonic currents and are very reliable but have some disadvantages: first they require a bulky and expensive line-frequency input power transformer to create galvanic isolation; moreover they are sensitive to voltage unbalance.

The use of a 6-pulse rectifier with a harmonic filter suppressing harmonics is also known. The harmonic filter can be passive or active. Passive filters have low power losses but are costly and have a big size and a big weight. Active filters are regarded as less reliable, have higher power losses and switching distortions, and are quite expensive.

Another known solution is the active front-end, comprising controlled active switches, diodes and high frequency line reactors. Even if its size and weight can be attractive and its cost can be lower than other solutions, it presents some disadvantages, in particular it is perceived as less reliable and it is difficult to match the power losses and the switching distortions of a passive system.

In the state of the art two harmonic cancelling interphase magnetic devices or splitters are known: a non inductive splitter, shown in FIGS. 1A and 2 with the reference number 300, and an inductive splitter, shown in FIG. 3A with the reference number 500, which comprises a three phase inductor 400 (FIG. 4) and the non inductive splitter 300 of FIGS. 1A and 2.

As shown in FIGS. 1A and 3A, a harmonic cancelling interphase magnetic device or splitter, inductive or not, comprises three power inputs, connectable to a three phase power grid or power line 100, and six power outputs, i.e. two power outputs for each power input. In one embodiment it comprises more than two power outputs for each power input, so that the number of power outputs can be nine, twelve, etc. The power outputs are galvanically connected to the three power inputs and connectable to a six-phase linear load 200. In this case there is not a galvanic isolation between power inputs and outputs as in the case of a transformer.

The three-phase electric power grid 100 supplies three approximately sinusoidal voltages with 120° phase shift. The phase shift between the three input currents $I_{L1}, I_{L2}, I_{L3}$ flowing in the three power inputs is then equal to 120° as illustrated in FIG. 1B. The amplitude and the frequency of the line voltages will vary according among others to local regulations, but the frequency will be equal, in most applications, to 50 Hz or 60 Hz, and the voltage is usually comprised between 100 V and 1 kV, for example 400 V rms between phases. The frequency of 50 Hz or 60 Hz or the frequency of the power grid 100 will be referred to in the following as the fundamental frequency of the system.

Each of the currents flowing in the three power inputs and having the reference $I_{L1}$ or $I_{L2}$ or $I_{L3}$ will be named in the following as the common current. When a non inductive splitter is preceded by a power grid 100 as FIG. 1A shows, the three common currents $I_{L1}, I_{L2}, I_{L3}$ are in phase with the voltage phasors of the power grid 100.

When this harmonic cancelling interphase magnetic device or splitter, inductive or not, is connected between the three phase power grid and a load, it splits each of the common currents $I_{L1}, I_{L2}, I_{L3}$ into two or more currents flowing in each power outputs. In the case shown in FIGS. 1A to 1C, it splits each of the current $I_{L1}, I_{L2}, I_{L3}$ into two currents: the common current $I_{L1}$ is split into the two split currents $I_{S1.1}, I_{S1.2}$, the common current $I_{L2}$ is split into the two split currents $I_{S2.1}, I_{S2.2}$, and the common current $I_{L3}$ is split into the two split currents $I_{S3.1}, I_{S3.2}$. The currents $I_{S1.1}, I_{S1.2}, I_{S2.1}, I_{S2.2}, I_{S3.1}, I_{S3.2}$ flowing in the power outputs have all the same amplitude and are phase shifted of a predetermined angle $\phi/2$ respect to the corresponding fundamental components flowing in the power input, as shown for example in FIG. 1C. The value of the angle $\phi$ and the number of power outputs line are related and depend on to the load.

In one preferred embodiment the value of the angle $\phi$ is 30° so that the phase shift between the two split currents, for example $I_{S1.1}, I_{S1.2}$, and the corresponding common current, in this case $I_{L1}$, is respectively of 15° and −15°.

As discussed, a common current, for example $I_{L1}$, is split into two split currents: a first split current $I_{S1.1}$, which will be called in the following leading split current, and a second split current $I_{S1.2}$, which will be called in the following lagging split current. In the other and $I_{S1.1}, I_{S2.1}$, and $I_{S3.1}$ are leading split currents and $I_{S1.2}, I_{S2.2}$ and $I_{S3.2}$ are lagging split currents.

In one preferred embodiment, the value of the angle $\phi$ is 30° as mentioned. In such a case the length of the phasors of the FIG. 1C, which is the same for all represented phasors, is 51.76% of the length of each phasor of FIG. 1B.

The non inductive splitter 300 of the state of the art, as illustrated in FIG. 2, is composed by three separated magnetic cores 300A, 300B and 300C. Each core does not contain air-gaps and comprises three vertical legs: the central leg is a wound leg containing windings 302. The upper part of FIG. 2 shows a top view of a non inductive splitter according to the state of the art, the lower part a side view.

JP2000358372A and JP2007028846A describes a system allowing the elimination of the transformer and a method for reduced size and weight by using an inter-phase device which comprises three separated iron cores as shown in FIG. 2.

FIG. 3A shows an inductive splitter 500 according to the state of the art, connected between a three phase power line 100 and a six-phase linear load 200. Such a splitter 500 is composed by a three-phase inductor 400 followed by the non inductive splitter 300 described above.

A top view and a side view of the three-phase inductor 400 are illustrated in FIG. 4: it comprises two yokes 405, three wound legs 403 and air-gaps 402, then it can store energy.

The total number of magnetic core of an inductive splitter 500 is the at least four, i.e. the magnetic core of the three-phase inductor 400 plus the three magnetic cores of the non inductive splitter 300.

The presence of the three-phase inductor causes a lagging angle or phase shift angle δ shown in FIG. 3B between each of the voltage phasors of the power grid 100, represented by dashed lines, and the corresponding input currents $I_{L1}$ or $I_{L2}$ or $I_{L3}$. Again, as described, an inductive splitter 500 splits each of the current $I_{L1}$, $I_{L2}$, $I_{L3}$ into two currents $I_{S1.1}$, $I_{S1.2}$, $I_{S2.1}$, $I_{S2.2}$, $I_{S3.1}$, $I_{S3.2}$. These currents flowing in the power outputs have all the same amplitude and are phase shifted of a predetermined angle respect to the corresponding fundamental components flowing in the power input. As shown in FIG. 3C, the lagging angle or phase shift angle δ is still present in the phasor diagram of the output currents.

In general the load 200' to which a non inductive splitter 300 or an inductive splitter 500 is connected is composed by a 12-pulse rectifier followed by a DC link. This load 200' is non-linear and then can create harmonics. A DC link in this application means the part following the 12-pulse rectifier, i.e. an inverter, a motor drive or any device supplied by a DC voltage.

The choice between the use of a non inductive splitter 300 or of an inductive splitter 500 depends on the impedance of the DC link.

In a system comprising a three-phase power line 100, a splitter, a 12-pulse rectifier and a DC link, an inductor or a choke is used have a continuous-conduction mode or CCM. Continuous-conduction mode (CCM) means that the current never goes to zero between switching cycles of diodes of the rectifier. On the contrary, in discontinuous-conduction-mode (DCM) the current can go to zero during part of the switching cycle.

A non inductive splitter 300, which does not contain inductor, is preferred in the case where the DC link has high impedance $Z_H$, as shown in FIG. 5. In other words, the presence of an inductor is assured by the DC link, so that the splitter can be "non inductive", i.e. it does not contain any inductor.

An inductive splitter 500 are applicable both in high and low ($Z_L$) impedance DC link rectifiers, because the CCM is ensured by the three-phase inductor 400 comprised in the inductive splitter 500, as shown in FIG. 6.

The more popular solution of a harmonics cancelling 12-pulse rectifier or low harmonic power converter has low DC link impedance, combined with an inductor or a choke preceding the splitter. In other words, the use of an inductive splitter 500, i.e. a three-phase inductor 400 followed by a non inductive splitter 300, is the more common solution. This solution has the drawback of requiring at least four magnetic cores as discussed, so that it is voluminous and expensive.

FIGS. 7 and 8 show examples of harmonics cancelling 12-pulse rectifiers, with state of the art not inductive respectively inductive splitters. In FIGS. 7 and 8 the non inductive splitter 300 comprises nine windings, three for each magnetic core, that are electrically and magnetically connected each other. A different number and combination of windings are possible.

The non inductive splitter 300 described in the prior art is composed by three or more cores. Moreover the shape of these cores is not designed to allow a possible optimization and then a lower size and a lower cost of the magnetic device. Moreover the total number of the windings is quite high, i.e. superior to nine, and it is difficult to reduce.

When such a non inductive splitter is used in combination with a low impedance DC link rectifier, which is the most popular case, it requires an additional inductor or choke for having CCM so that the whole system requires more material and is then more voluminous and more expensive.

The solutions described in the prior art for inductive and not inductive splitter in the other terms are not optimised for reducing the cost and the size of a low harmonic power converter.

A solution allowing a low harmonic power converter having lower cost and lower size than the prior art is needed.

A magnetic device allowing less material and a total number of windings inferior to the total number of windings used in the prior art is needed.

A solution allowing a low harmonic power converter not sensitive to the imbalance both of the load and of the power grid is needed.

A low harmonic power converter having low failure rate, low power losses and low switching distortion is also needed.

A low harmonic power converter comprising simple semiconductor circuitry to minimize power line harmonics is also needed.

BRIEF SUMMARY OF THE INVENTION

The aim of the present invention is to provide a magnetic device with an optimized shape of the core allowing a lower size, weight and cost, and better symmetry of the device than the prior art.

One object of the present invention is to provide a magnetic device with a shape allowing a lower number of windings than the prior art.

Another object of the present invention is to provide a low harmonic power converter comprising a simple semiconductor circuitry.

According to the invention, these aims are achieved by means of a harmonic cancelling interphase magnetic device according to claim 1, by means of a use of this magnetic device in a AC/DC power converter (claim 14) and in a DC/AC power converter (claim 16) and by means of a low harmonics bidirectional front-end according to claim 17.

The device according to the invention comprises a connected magnetic core. The adjective connected in this context means that a fully contained path can be drawn between any two points of the magnetic core. In other words the device contains a single magnetic core that does not contain air-gaps.

The device has three power inputs connectable to a three phase power line or grid and at least two power outputs for each power inputs. In one preferred embodiment the device has six power outputs, i.e. two power outputs for each power inputs. The power outputs are galvanically connected to the three power inputs and can be connected to a load.

When said device is connected between the three phase power grid and the load, for example a 12 pulse-rectifier followed by a DC link, the fundamental components of the currents flowing in each of the power outputs are phase shifted of a predetermined angle respect to the corresponding fundamental component of the current flowing in the power input. Again, the angle's value depends on the pulse-rectifier that can be connected to this device.

In a first embodiment the magnetic core of the device has a rectangular shape with five legs: three wound legs and two wound legs. The legs are arranged alternately, so that a wound leg is followed and preceded by a non-wound leg and vice-versa. The cross-section surface of the wound legs is twice as the cross-section surface of the non wound legs. This embodiment allows a simple and easy manufacturing, but does not have an optimal symmetry.

In another embodiment the magnetic core of the device comprises four legs: one non wound central leg and three wound external legs. The four legs have the same cross-section surface. This second embodiment is less easy to produce but has a better symmetry than the first embodiment, i.e. it is characterised by better parameters' values.

In another embodiment the magnetic core has a triangular or hexagonal shape comprising three star wound legs and three delta wound legs. The star wound legs forms a Y-shaped magnetic core part contained in the triangular or hexagonal contour of the magnetic core and connected with it in order to have a whole connected magnetic core as defined above.

The hexagonal shape allows to further reduce the size of the device compared to the triangular shape. In both cases, the number of windings is lower than the solutions of the prior art. Moreover the symmetry of the two embodiments allows identical reluctances of the magnetic circuit for each star wound leg and for each delta wound leg.

In the case of the triangular or hexagonal shape of the magnetic core, some energy can be stored in a magnetic field outside the magnetic core. In such a case a lagging angle or phase shift angle δ between each of the voltage phasors of the power grid 100 and the corresponding input current $I_{L1}$ or $I_{L2}$ or $I_{L3}$ of the magnetic device can be observed as shown in FIG. 3B. This energy storage outside the magnetic core means that the magnetic device with a hexagonal shape is like an inductive splitter 500 of the state of the art. In this case both functions, inductor plus non inductive splitter, are performed by the same device with a single and connected magnetic core. However it is difficult to control the value of the inductance of this device, since it is hard to control the external magnetic field.

Advantageously the magnetic device of the invention can be used both in AC/DC or in DC/AC converters. If it is used in an AC/DC converter, for example in combination with a 12-pulse rectifier, the current flow goes from the power inputs or common paths of the device to its power outputs or split paths. In this case the device works as a current splitter the common current in the common path is forced to split into two identical but phase shifted split currents in the split paths. In one embodiment the common current is forced to split into more than two identical but phase shifted split currents.

If the device is used in a DC/AC converter, the current flow goes from the two split paths to the common path. In this case the device works as a current merger. In both cases the action of the device reduces the harmonic currents. In an AC/DC or in a DC/AC converter comprising this magnetic device a galvanic isolation is not possible.

Advantages of the solution as compared with the prior art include in particular the possibility to use one core instead of four and a magnetic core for the device allowing a better symmetry and a lower number of windings.

The solution further reduces the size, the weight and the cost of a low harmonic power converter.

The solution eliminates some important harmonics like known multi-phase rectifiers but it is not sensitive to the voltage unbalance of the power grid.

BRIEF DESCRIPTION OF THE DRAWINGS

The invention will be better understood with the aid of the description of an embodiment given by way of example and illustrated by the figures, in which:

FIG. 1A shows a view of a non inductive splitter of the state of the art, connected between a three-phase power line and a six-phase linear load.

FIG. 3A shows a view of an inductive splitter of the state of the art, connected between a three-phase power line and a six-phase linear load.

FIG. 3B shows a phasor diagram of the input or common currents of an inductive splitter of the state of the art.

FIG. 3C shows a phasor diagram of the split currents, comprising leading split currents and lagging split currents, of an inductive splitter of the state of the art.

FIG. 4 shows a top view and a side view of a three-phase inductor of the state of the art.

FIG. 8 shows an example of application of an inductive splitter of the state of the art in a low impedance DC link 12-pulse rectifier.

FIG. 12A shows a possible embodiment of the magnetic core of the device of FIG. 11.

FIG. 12B shows a possible member of the magnetic core of the magnetic core of FIG. 12A.

FIG. 19 shows a view of a DC/AC inverter with a DC current source comprising a network of controlled switches and an embodiment of the device according to the invention.

FIG. 20 shows a view of a DC/AC inverter with a DC voltage source comprising a network of controlled switches and one embodiment of the device according to the invention.

FIGS. 21 to 22 show an harmonics cancelling 12-pulse front-end with a bidirectional power flow comprising an inductive device according to some aspects of the invention, in combination with a low impedance DC link.

DETAILED DESCRIPTION OF POSSIBLE EMBODIMENTS OF THE INVENTION

Figures 1B, 1C:
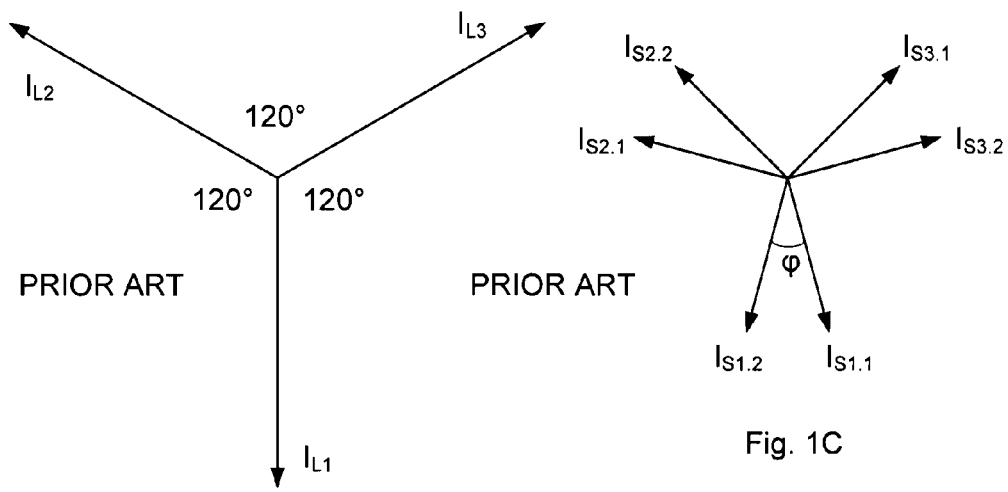
FIG. 1B shows a phasor diagram of the input or common currents of a non inductive splitter of the state of the art.
FIG. 1C shows a phasor diagram of the split currents, comprising leading split currents and lagging split currents, of a non inductive splitter of the state of the art.
Figure 2:
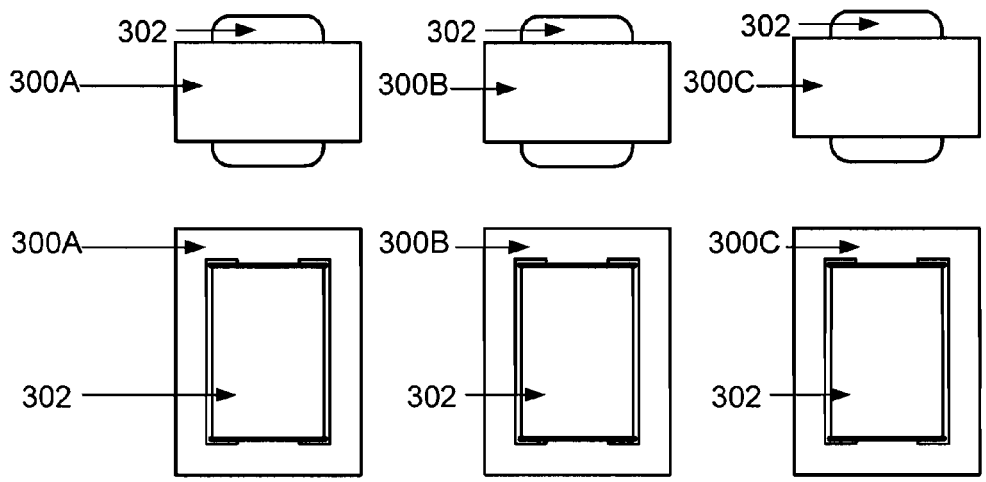
FIG. 2 shows a top view and a side view of a non inductive splitter of the state of the art.
Figure 5:
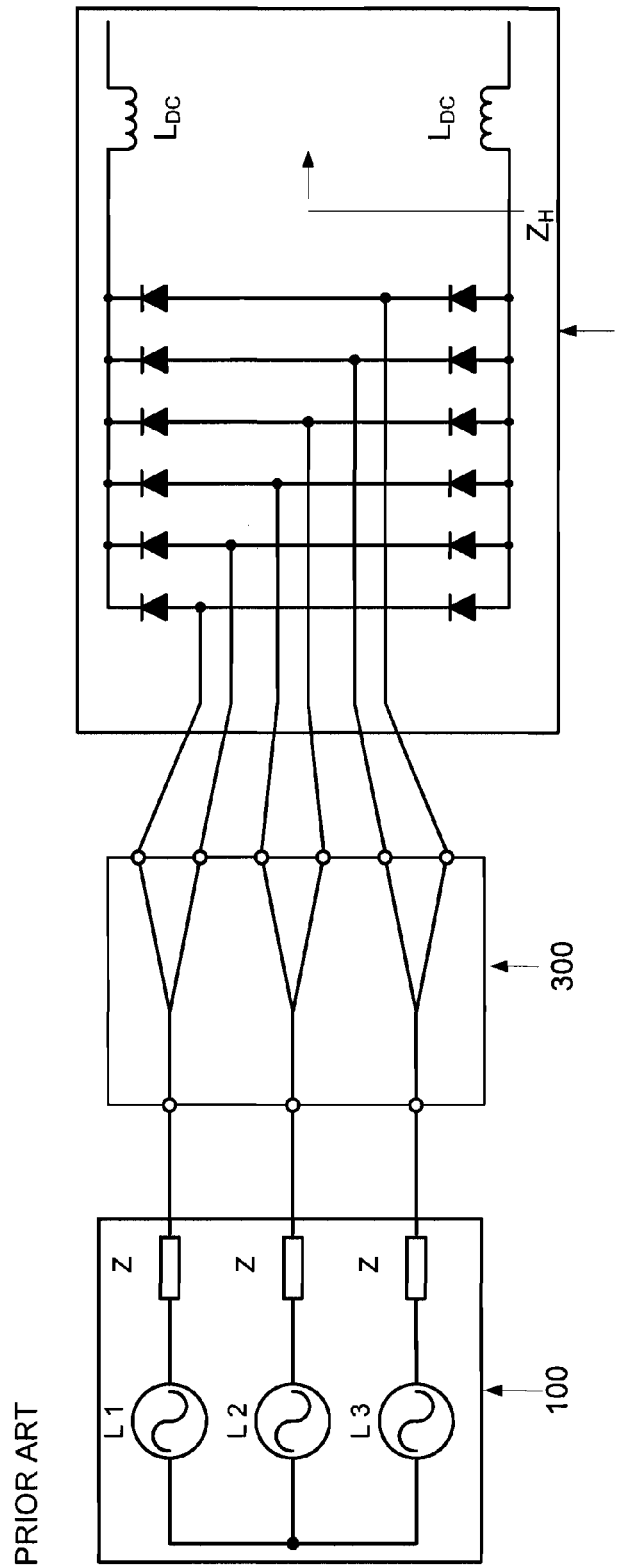
FIG. 5 shows an application of a non inductive splitter of the state of the art in a high impedance DC link 12-pulse rectifier.
Figure 6:
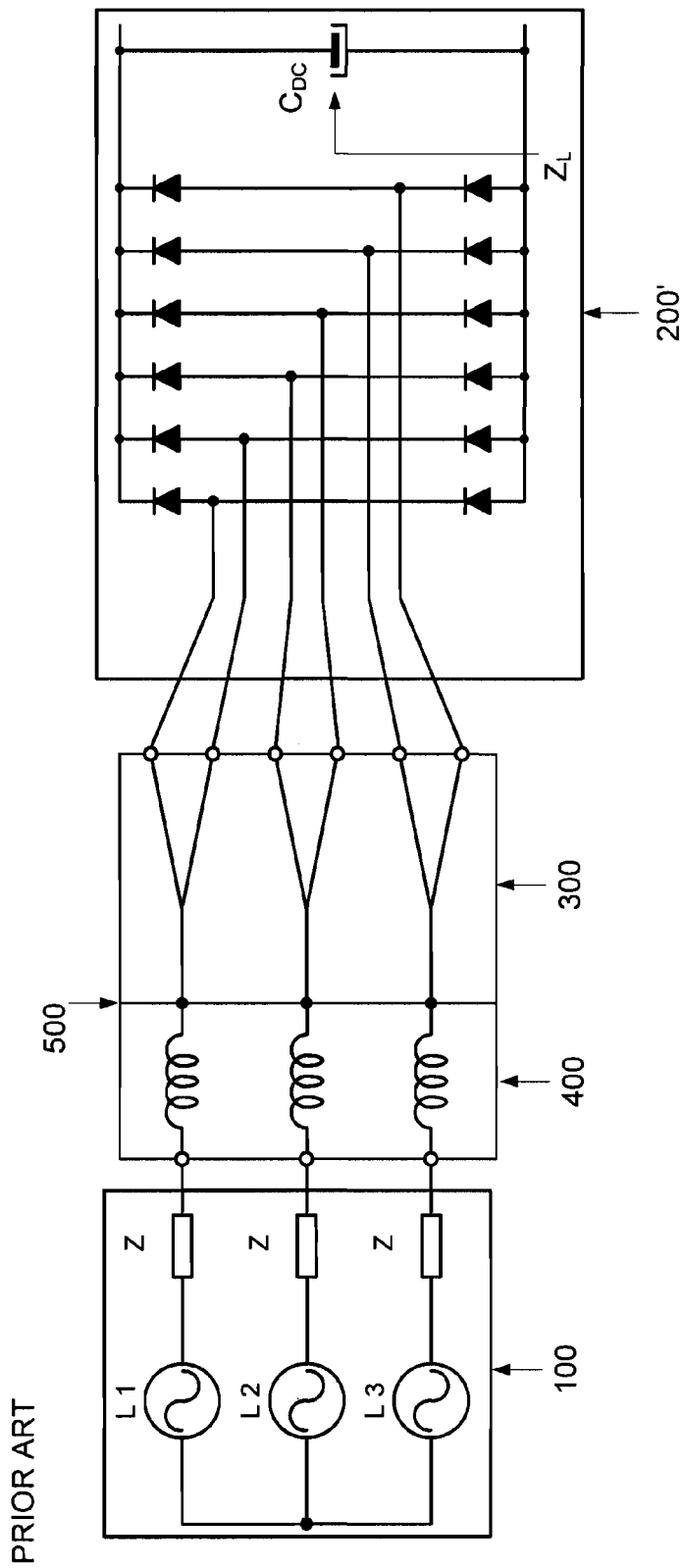
FIG. 6 shows an application of an inductive splitter of the state of the art in a low impedance DC link 12-pulse rectifier.
Figure 7:
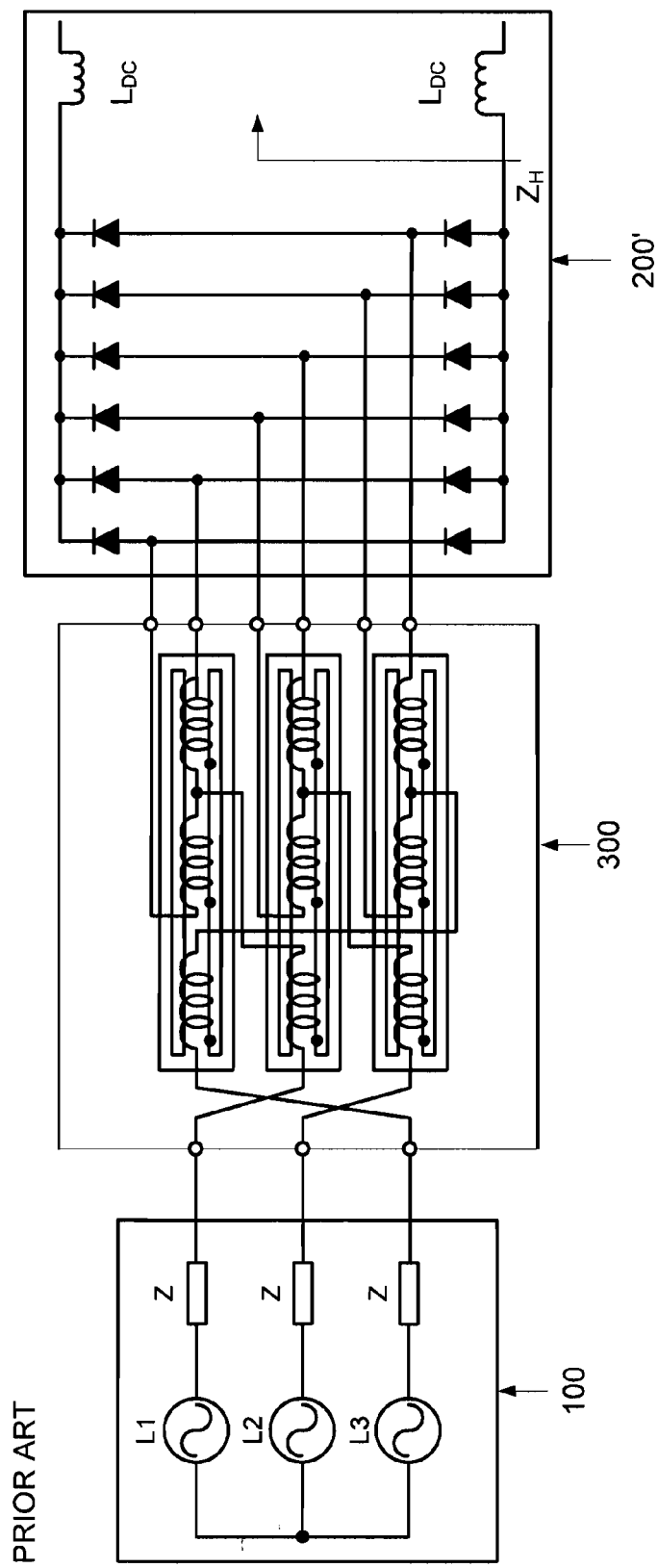
FIG. 7 shows an example of application of a non inductive splitter of the state of the art in a high impedance DC link 12-pulse rectifier.

The magnetic device of the invention is designed for a power converter. Its use enables a reduction of the harmonics of the currents drawn by the converter from three phase power line. It has a lower cost and size compared to the state of art solutions.

FIGS. 9A, 9B, 9C and 9D show respectively a top view, a side view, a cross-section of the top view and another side view of one possible embodiment of the device 1 according to the invention. In this embodiment the device 1 has a rectangular shape and comprises a connected and without air-gaps magnetic core 10 with five legs: three wound legs 12 and two non-wound legs 14. Each wound leg 14 contains a bobbin 20 with some windings.

This device is not simply obtained by combining three separated cores known in the state of the art: the connection of three separated cores implicates the cancelation of the fundamental component of the magnetic flux generated by the currents flowing into the windings. Only the harmonics of the magnetic flux, like the $3^{th}$, are then present in the device and they require one or more non-wound legs.

Figure 9A:
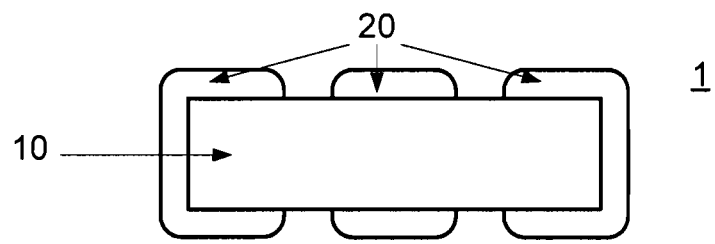
FIGS. 9A, 9B, 9C and 9D show respectively a top view, a side view, a cross-section of the top view and another side view of one embodiment of the harmonic cancelling interphase magnetic device according to the invention.
Figure 9B:
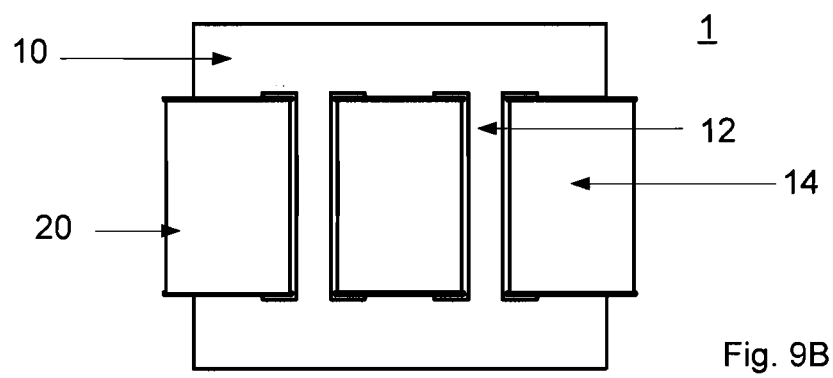
Figure 9C:
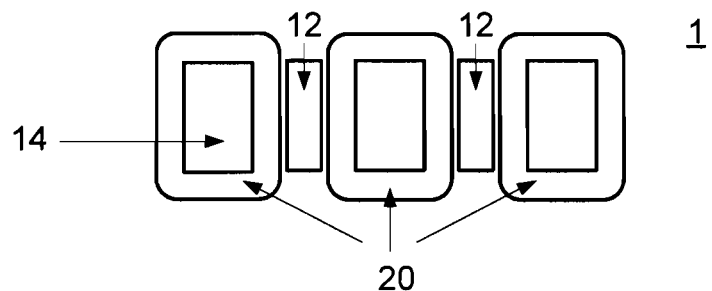
Figure 9D:
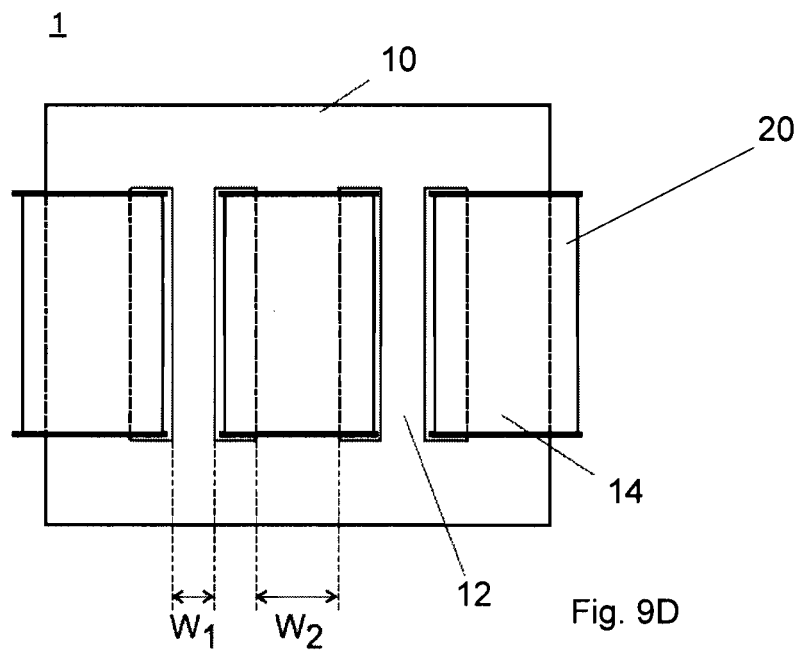
Figure 10D:
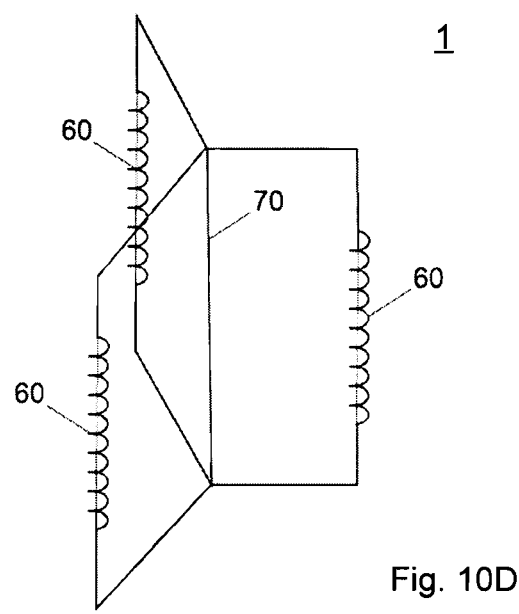
FIGS. 10A, 10B, 10C and 10D show respectively a top view, a side view, a cross-section of the top view and an angular view of another embodiment of the harmonic cancelling interphase magnetic device according to the invention.
Figure 10A:
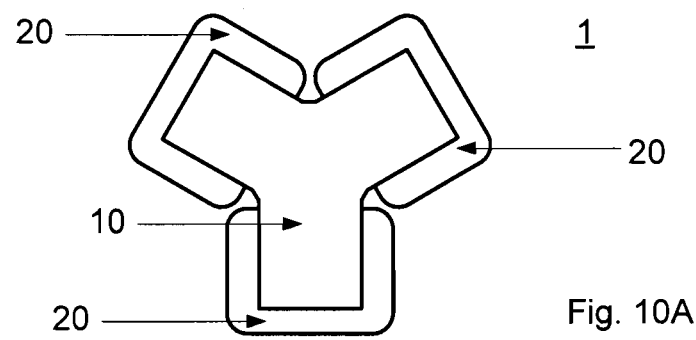
Figure 10B:
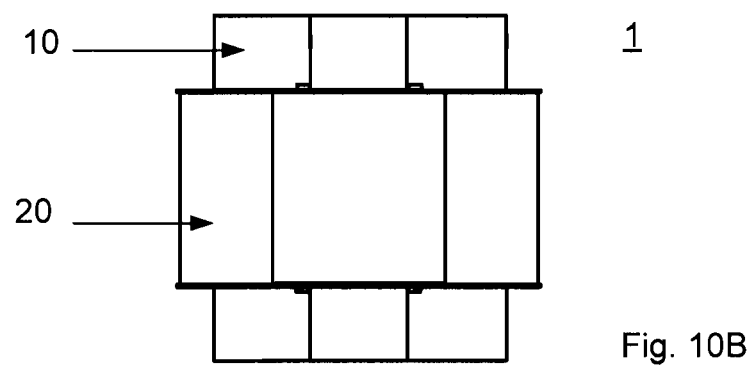
Figure 10C:
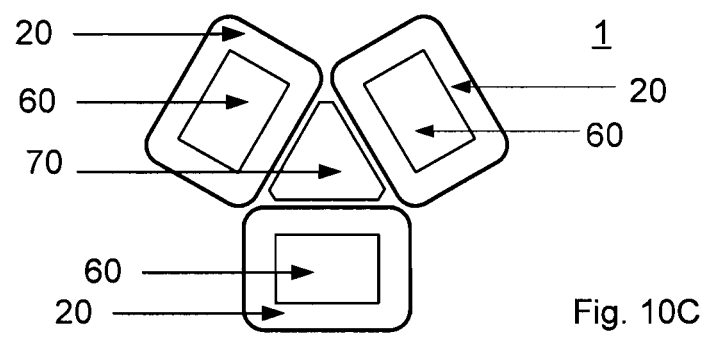

Advantageously the width W1 of the cross-section of the non-wound legs 12 of the device 1 is thinner than the width W2 of the cross-section of the wound legs 14, as detailed in FIG. 9D. In one embodiment the width W1 of the cross-section of the non-wound legs 12 is half of the width W2 of the cross-section of the wound legs 14. In other words, the cross-section surface of a wound leg 14 is twice as the cross-section surface of a non-wound leg 12. This allows saving material and a lower size and weight of the device 1 compared to the state of the art, where there are three separated cores and for each core there is one return path having a cross-section W2:

State of art: W2+W2+W2=3*W2 (total width of return paths)

Now: W1+W1=W2 (total width of return paths)

In the device 1 of the invention only the harmonics, like the $3^{th}$, of the magnetic flux are present in the non-wound legs 12, and they have the same pick or maximum value of the flux in the wound legs 14. In other words, advantageously the design and the shape of the magnetic core 10 of the embodiment of FIG. 9D allow that the harmonics of the flux, like the $3^{th}$, have return path through non-wound part 14 of the core 10. Moreover the magnetic core 10 does not contain air-gaps, because it is not intended for energy storage.

The device 1 allows saving material and has a lower size and weight compared to a conventional transformer. The dimensions of the device 1 in the embodiment of FIGS. 9A to 9D depend on the power converted by the system. For example in the case of a 32 kW twelve-pulse rectifier application, the length is inferior to 30 cm, the width is inferior to 12 cm and the height is inferior to 22 cm. In this case the mass of the device is inferior to 35 kg. For the same power, the dimensions of a conventional transformer used in a twelve-pulse rectifier are about 50 cm×25 cm×50 cm and its mass is about 150 kg. Then the dimensions and the mass of the device 1 according to the invention are lower than the dimensions and the mass of the conventional transformer for the same power twelve-pulse rectifier.

FIGS. 10A, 10B, 10C and 10D show respectively a top view, a side view, a cross-section of the top view and an angular view of another embodiment of the harmonic cancelling interphase magnetic device according to the invention. In this case the magnetic core has a star-shaped section (top and bottom) and comprises four legs: three star wound legs 60 and a common return-path leg 70, which is non-wound. Again, the magnetic core is connected and does not have any air-gaps.

In this embodiment the cross-section surface of the three star wound legs 60 is the same of the cross-section surface of common return-path leg 70. The total width of the cross-section of the return path is again W2, i.e. width of the cross-section of the non-wound leg 70 which in this case is equal to the cross-section of the wound legs 60. On can see that the function performed by the two non-wound legs 12 in the device of FIG. 9A is now made by the central leg 70 of the FIG. 10A, which has a cross-section surface twice as the cross-section surface of the non-wound legs 12.

The embodiment of FIGS. 10A to 10D ensures full symmetry of magnetic core and allows identical conditions for the windings around the legs 60. The flux of each of wound leg 60 has return path both through said wound legs 60 and a common return-path leg 70. In the leg 70 fundamental components of the flux are cancelled. Leg 70 is intended to conduct harmonics of the flux. Moreover this embodiment is easy to manufacturing.

In both embodiments, i.e. magnetic core with a rectangular shape and five legs (FIGS. 9A to 9D) and magnetic core with a star-shaped section and four legs (FIGS. 10A to 10D), the windings are designed like windings of the state of the art splitter with three separated magnetic cores.

Figure 11A:
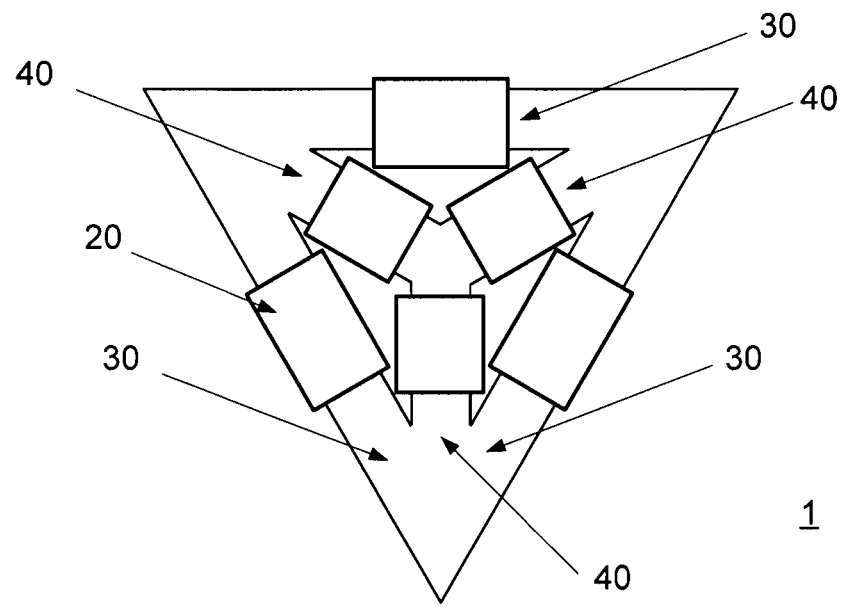
FIGS. 11A and 11B show a frontal view of two other embodiments of the harmonic cancelling interphase magnetic device according to the invention.

FIG. 11A illustrates a frontal view of one embodiment of the device 1. Again, the magnetic core is connected and does not contain air-gaps. It has a triangular shape comprising three star wound legs 40 and three delta wound legs 30.

The three delta wound legs 30 are the three sides of the triangular contour of the magnetic core 10. The star wound legs 40 form a Y-shaped magnetic core part contained in the triangular contour of the magnetic core 10 and connected with it in order to have a whole connected magnetic core 10 as defined above.

In other words in this embodiment three peripheral legs 30 are magnetically connected in a delta and three central legs 40 are magnetically connected in a star. As will be shown, this particular symmetric shape allows a total number of windings that in one embodiment is equal to six.

Figure 11B:
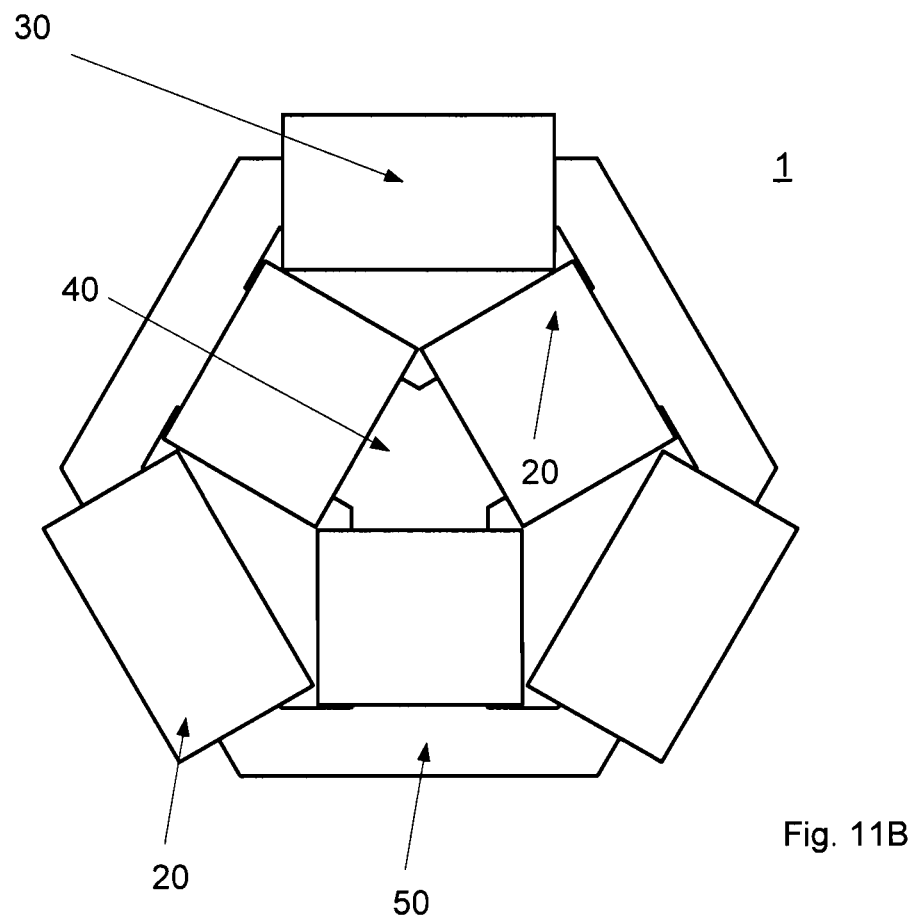

For further reducing the size of the device, in the preferred embodiment shown in FIG. 11B the magnetic core contains again three star wound legs 40 and three delta wound legs 30, but has an hexagonal shape. In other words the magnetic core of FIG. 11B is obtained from the triangular magnetic core of FIG. 11A by replacing the vertex of the triangle with the three sides 50.

The magnetic core 10 of the hexagonal embodiment of FIG. 11B can advantageously be constituted by six C-shaped sub-core 45 shown in FIGS. 12A and 12B. In this case the cross-section of the star wound legs 40 automatically is twice as the cross-section of the delta legs 30. In another embodiment the cross-section of the star wound legs 40 is bigger than the cross-section of the delta legs 30.

In one embodiment the magnetic core 10 is a laminated iron or ferromagnetic core. The magnetic core can be a stacked core, i.e. a core made by stacking layers of thin conducting laminations. Each lamination is insulated from its neighbours by a thin non-conducting layer of insulation. The effect of laminations is to confine eddy currents and to reduce their magnitude. Thinner laminations reduce losses, but are more laborious and expensive to construct.

Cut cores as the C-Cores 45 of FIG. 12B are strip wound cores, impregnated after annealing, then cut in parts and lapped. Since these cores are assembled around the bobbins in a very short time, the device 1 of this embodiment takes less time to manufacture the device.

FIG. 13A to 16C show different embodiments of the windings on the core of the device according to one aspect of the invention, of the windings in an electric and circuital representation and in a phasor diagram of MMF vectors.

Figure 13A:
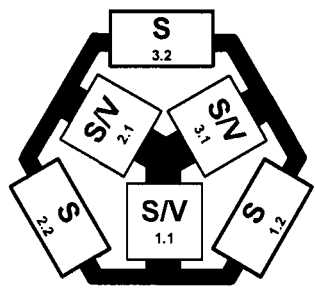
FIG. 13A to 16C show different embodiments of the windings on the core of the device according to one aspect of the invention, of the windings in an electric and circuital representation and in a phasor diagram of MMF vectors.
Figure 13B:
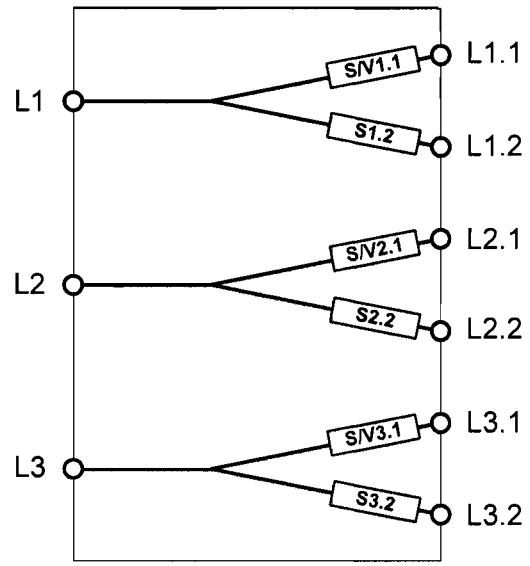

In the embodiment of FIG. 13A the device contains six windings on the magnetic core 10: in particular each of the delta wound legs 30 comprises one split winding S and each of the star wound leg 40 comprises one split/spreader winding S/V. The name for the windings is explained referring to FIG. 13C, which is a representation of the MMF (Magneto-Motive Force) vectors.

In order to have a splitting device as described, the following constraint for each close magnetic circuit has to be satisfied: the sum of the MMFs of this magnetic circuit has to be zero. A MMF related to one winding is done by the instantaneous value of the current flowing in this winding multiplied by its number of turns. In other words it means that the MMF vectors of a magnetic circuit have to form a close path.

Figure 13C:
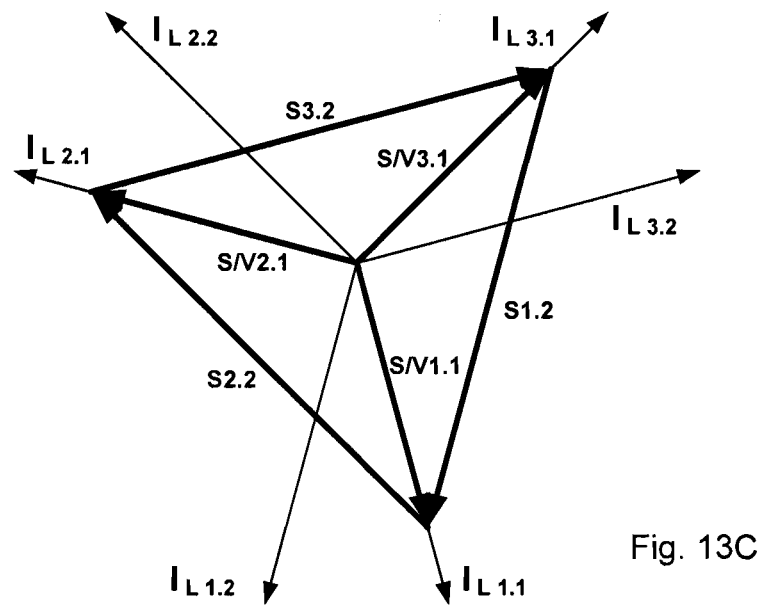

In the embodiments of FIG. 13C there are three magnetic circuits, each of which comprises a close triangular path. In the triangular formed by the MMF vectors S/V2.1, S3.2, and S/V3.1, S/V2.1 works as a split leading vector (leading because it corresponds to the leading current $I_{2.1}$ flowing in the electrical circuit shown in FIG. 13B), S3.2 as a split lagging vector (lagging because it corresponds to the lagging current $I_{3.2}$) and S/V3.1 as a spreader leading vector (leading because it corresponds to the leading current $I_{3.1}$). S/V3.1 is in this case a spreader because it closes the triangular path made by these three vectors.

In the triangular formed by the MMF vectors S/V3.1, S1.2, and S/V1.1, S/V3.1 works now as a split leading vector and the spreader in this case is S/V1.1 because it closes the triangular path made by these three vectors. Again S/V1.1 is a split in the triangular formed by the MMF vectors S/V1.1, S2.2, and S/V2.1 and the spreader in this case is S/V2.1 which is, as shown above, a split vector in the first considered triangular, formed by the MMF vectors S/V2.1, S3.2, and S/V3.1.

Due to the reduce number of windings, the windings S/V1.1, S/V2.1 and S/V3.1 work as split or spreader windings depending on what magnetic circuit one is considering. In this embodiment such split/spreader windings are all leading windings, because they correspond to the leading currents $I_{1.1}$, $I_{2.1}$ and and $I_{3.1}$ flowing in the electrical circuit shown in FIG. 13B.

Figure 14A:
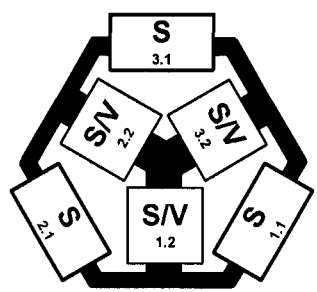
Figure 14B:
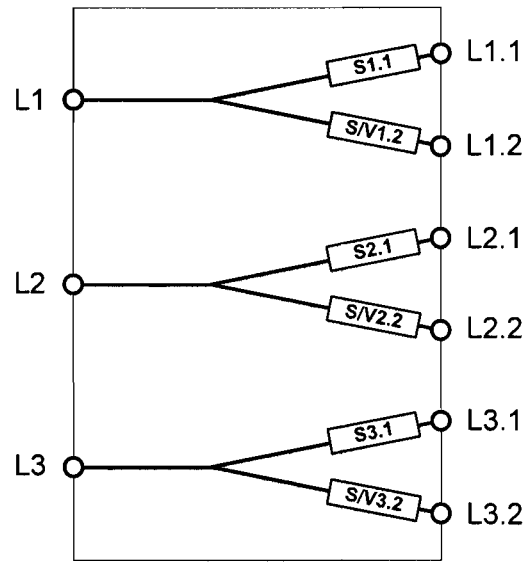
Figure 14C:
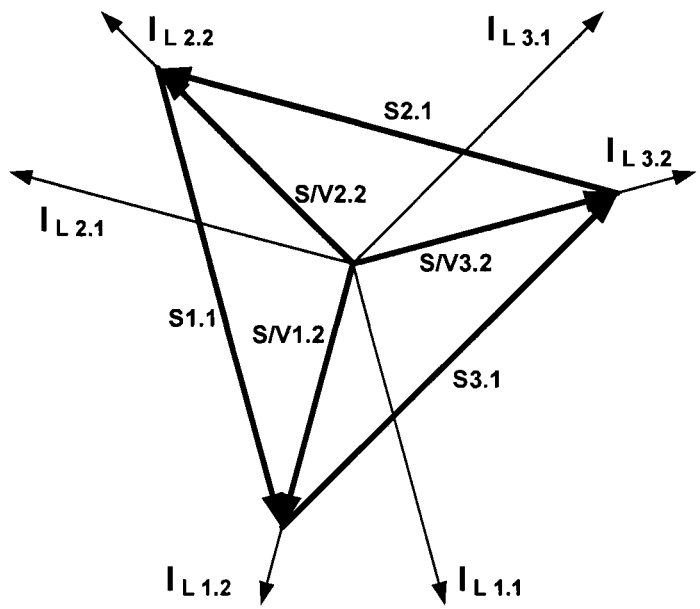

FIGS. 14A to 14C show another embodiment in which the device contains six windings. Due to the reduce number of windings, again some windings like S/V1.2, S/V2.2 and S/V3.2 work as split or spreader windings depending on what magnetic circuit one is considering. In this embodiment such split/spreader windings are all lagging windings, because they correspond to the lagging currents $I_{1.2}$, $I_{2.2}$ and $I_{3.2}$ flowing in the electrical circuit shown in FIG. 14B.

In both cases of FIGS. 13A and 14A, the split windings are wound around the delta legs 30 and the split/spreader windings around the star legs 40.

Figure 15A:
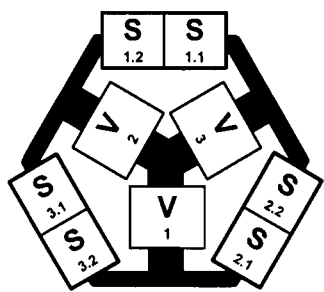
Figure 15B:
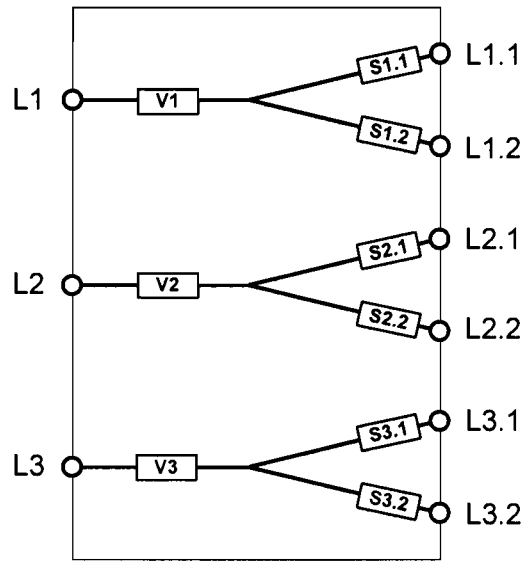
Figure 15C:
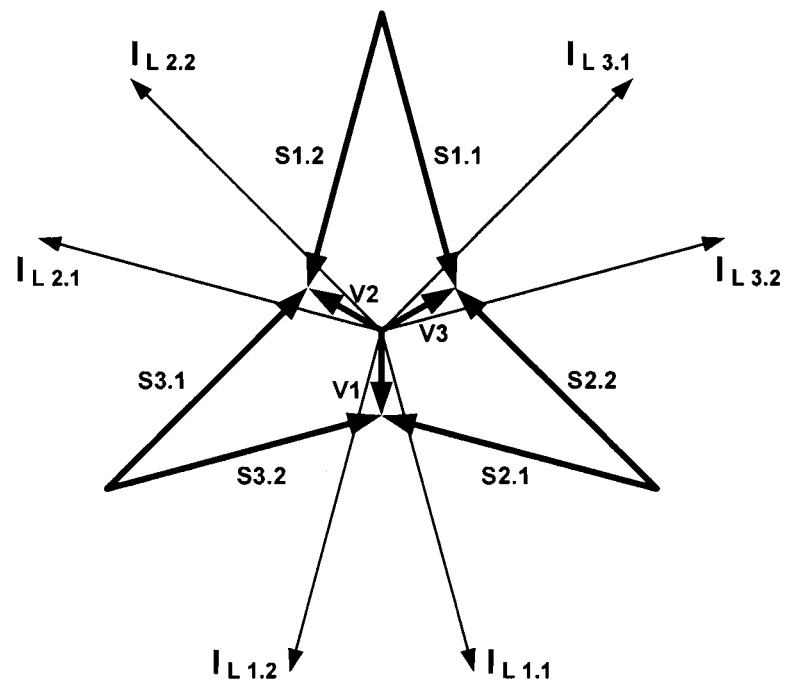

FIGS. 15A to 15C show another embodiment in which the device contains nine windings. In such a case the number of windings is sufficient to do not have split/spreader windings, but windings with a single function: or split winding or spreader winding. In this case the spreader windings, denoted by references V1, V2, and V3, are always wound around the star legs 40. Each of the delta wound legs 30 contains one split leading winging (S1.1, S2.1 and S3.1) and one split lagging winding (S1.2, S2.2 and S3.2).

As shown in FIG. 15B, in such a case each of the three common paths in the electrical circuit of the device contains one winding, which is a spreader winding.

In general each split winding conducts one split current and each spreader winding conducts one phase current, i.e. $I_{L1}$, $I_{L2}$ and $I_{L3}$. A spreader winding V can be any type of winding. In one embodiment the spreader winding V of a leg of the device can be a split winding S of another leg of the same device. In another embodiment the vector spreader winding V can be an external winding: in such a case the current flowing in the winding V is an external and controllable current.

The close MMF path illustrated in FIG. 15C is not triangular as in the case of FIGS. 13C and 14C but it has a quadrilateral shape.

Figure 16A:
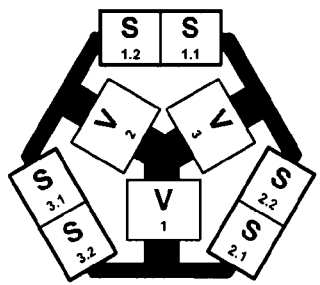
Figure 16B:
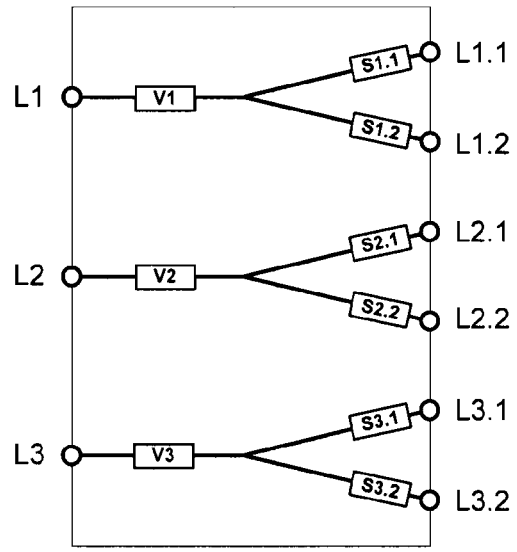
Figure 16C:
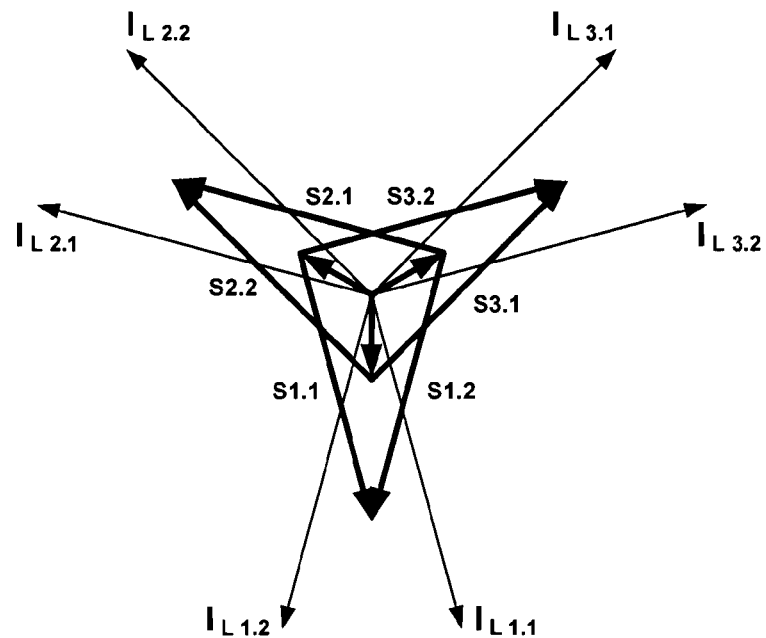

FIGS. 16A to 16C show another embodiment in which the device contains nine windings.

In the case of the hexagonal shape of the magnetic core, some energy can be stored in a magnetic field outside the magnetic core. In such a case a lagging angle or phase shift angle δ shown in FIG. 3B between each of the voltage phasors of the power grid 100 and the corresponding input current $I_{L1}$ or $I_{L2}$ or $I_{L3}$ of the magnetic device can be observed. This energy storage outside the magnetic core means that the magnetic device with a hexagonal shape is like an inductive splitter 500 of the state of the art. In this case both functions, inductor plus non inductive splitter are performed by the same device with a single and connected magnetic core. However it is difficult to control the value of the inductance of this device, since it is hard to control the external magnetic field.

The use of the magnetic device 1 in a power converter allows the elimination of the $5^{th}$ and $7^{th}$ and $19^{th}$, $29^{th}$ and $31^{th}$ harmonics. Tests have shown that the Total Harmonic Distortion (THD) can be inferior to about 13%. In the case of a 6-diodes rectifier with a DC link choke for example, harmonics are not eliminated and the THD is inferior to 40%.

As shown in the electrical circuits of FIGS. 13B, 14B, 15B and 16B, the device 1 according to the invention contains three common-paths belonging to a phase (L1, L2, L3) and two split-paths, belonging to a different phase. In another embodiment the number of split-paths can be more than two. When this device is used in an AC/DC power converter and then the power flow goes from an AC input to a DC output, as described above the device 1 works as a vector current splitter. In fact the current flowing in the common path is split into two or more identical but phase shifted components flowing in the split paths. In another embodiment the number of the split paths can be three or more.

Advantageously the device 1 can be used in a DC/AC power converter. In such a case the power flow goes from a DC input to an AC output and the device 1 works as a vector current merger. In fact the current flowing in the split paths is merged into a common path. Also in this case the number of the split paths can be three or more.

In other words, for each phase of the three input lines connectable to a three phase power grid 100 a vector current splitter/merger device 1 can be used. When this device works as a splitter, it splits an input current into two or more split currents having controllable phase shift and amplitude; when it works as a merger, it combines two or more split currents with controllable phase shift and amplitude into an output current.

The common path of the device 1 according to the invention can comprise zero (FIGS. 13B and 14B) or one spreader winding (FIGS. 15B and 16B). Each of the split paths comprises one split/spreader (FIGS. 13B and 14B) or split (FIGS.

15B and 16B) winding. Depending on the number and the position of windings in the common and split paths, a classification comprising different kinds of device can be built.

The number of windings is selected so that the amplitude of the fundamental frequency component of the split currents flowing in the split paths is identical and the phase shift between the fundamental frequency components of split currents is equal to a predetermined angle. In a preferred embodiment the value of this angle is 30°.

Figure 17:
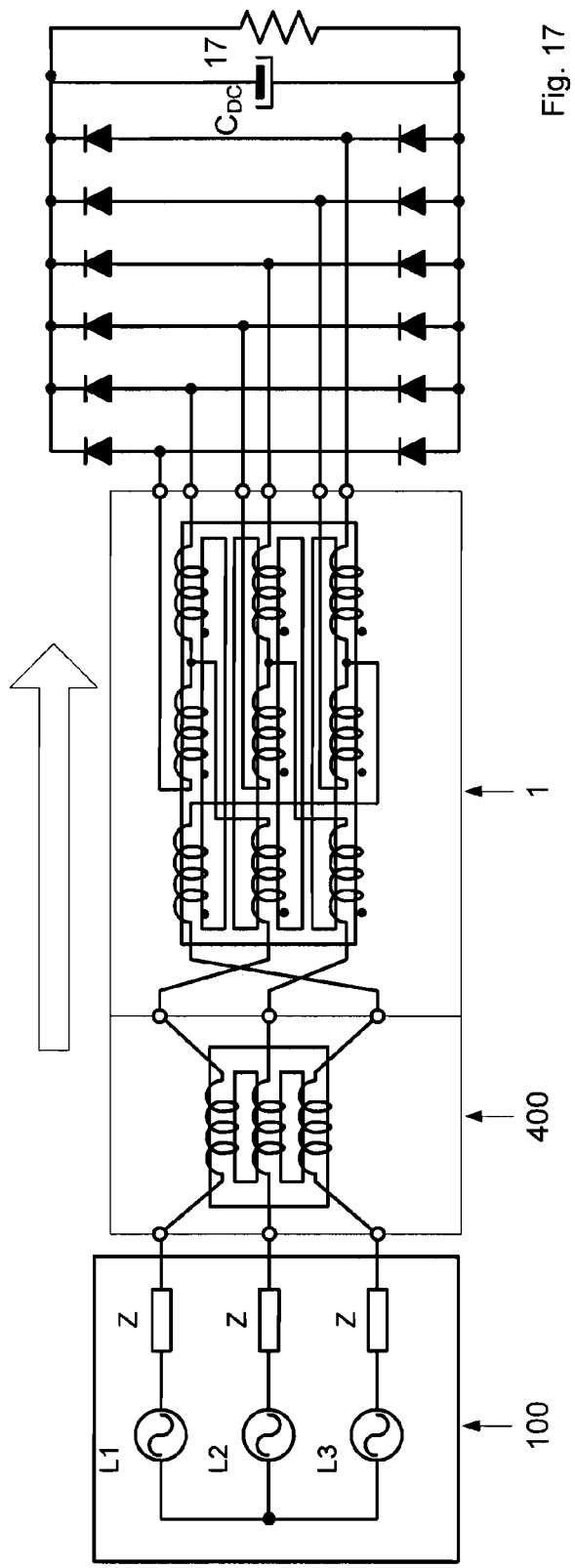
FIGS. 17 to 18 show an harmonics cancelling 12-pulse rectifier with an unidirectional power flow comprising an inductive device according to some aspects of the invention, in combination with a low impedance DC link.

FIG. 17 illustrates an AC/DC power converter including a magnetic component or device 1 according to some embodiments of the invention. In this Figure the device has a rectangular shape and five legs as in the embodiment of FIGS. 9A to 9D. The device of FIG. 10A to 10D, with a star-shaped section and four legs, can equally be used instead.

The DC link has a low impedance as schematically illustrated by the presence of the capacitor $C_{DC}$ and then, in order to have a CCM an inductor 400 is requested.

The device 1 has six outputs, because it splits each of the three common currents into two split currents. Three of these outputs are sent to 12-diodes rectifier. The outputs of these diodes are combined as shown in FIG. 17 to form a DC output. In this case the value of the phase difference between the two currents flowing in the spit paths is equal to 30°. The DC link is represented by a capacitor $C_{DC}$ and a generic load 17.

In the case in which the device 1 is connected to a 18-pulse rectifier, i.e. three 6-pulse rectifiers, it has nine output lines because it splits each of the three common currents into three split currents. In this case the value of the phase difference between two currents flowing in two contiguous spit paths is equal to 20°.

Figure 18:
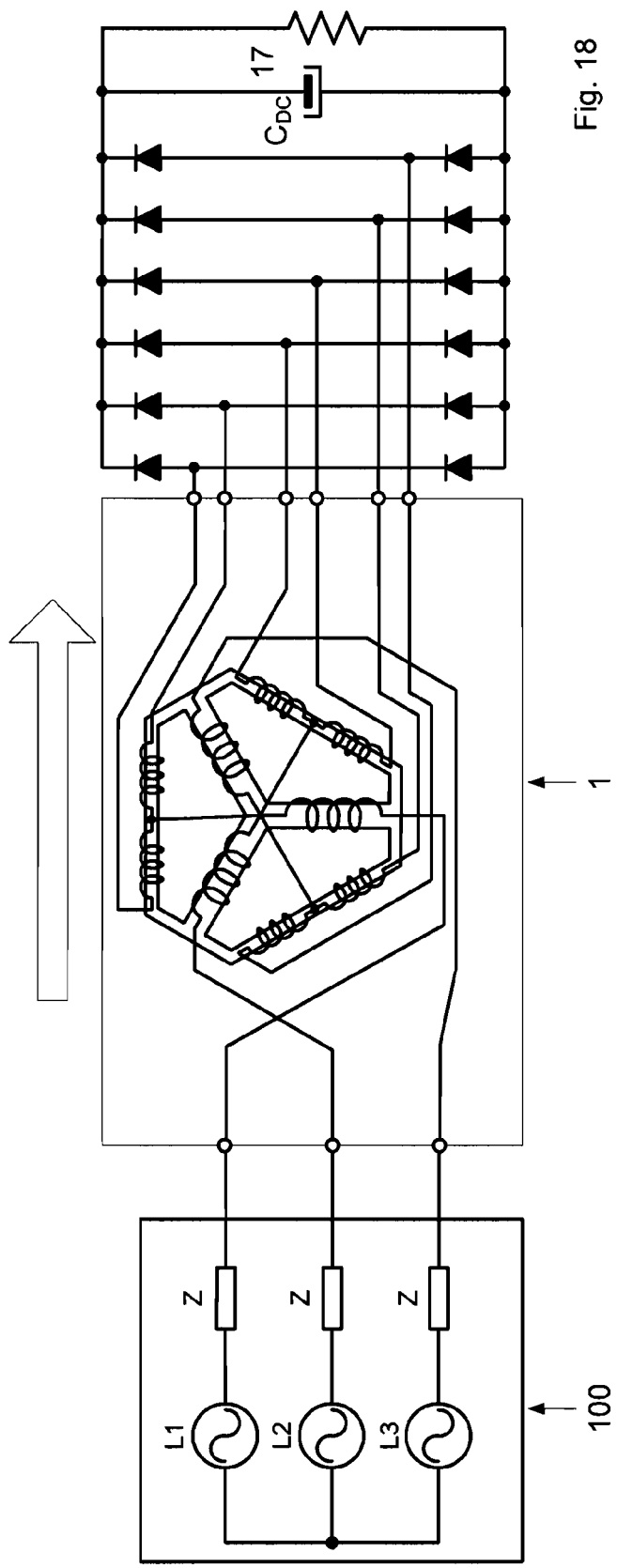

FIG. 18 illustrates an AC/DC power converter including a magnetic component or device 1 according to one embodiment of the invention. In this Figure the device has a hexagonal shape as in the embodiment of FIG. 11.

Even if the DC link has a low impedance as schematically illustrated by the presence of the capacitor $C_{DC}$, in such a case an additional inductor 400 is not requested because, as described, in the case of the hexagonal shape of the magnetic core, some energy can be stored in a magnetic field outside the magnetic core. This energy storage outside the magnetic core means that the magnetic device with a hexagonal shape is like an inductive splitter 500 of the state of the art. In this case both functions, inductor plus non inductive splitter, are performed by the same device with a single and connected magnetic core. Compared to the state of the art solution illustrated in FIG. 8, in this case only one magnetic core, instead of four, is used.

As indicated by the arrow above the device 1, in both FIGS. 17 and 18, the power flow is unidirectional and in particular it goes from AC to DC.

As discussed, the device 1 can be used also as a merger in a DC/AC inverter. FIGS. 19 and 20 show a DC/AC converter with a device 1. As described in such a case the device works as a current merger. The DC/AC converter comprises a 12 or more pulse bridge of controlled switches 600. In one embodiment these active switches are transistors or Insulated Gate Bipolar Transistors (IGBTs). A driving circuit, not shown, is arranged to change the status of the active switches. FIG. 19 shows a view of a DC/AC inverter with a DC current source 401, FIG. 20 with a DC voltage source 402 and an inductor 400.

When the device 1 is used in a DC/AC power converter, it merges each pair of split currents into a common current. In another embodiment the number of split currents to merge is nine or more.

The device 1 connected between the three phase power grid 100 and a 12-pulse rectifier produces a DC current of a predetermined direction and a DC voltage of a predetermined polarity. If SCR's are used instead of diodes in the 12-pulse rectifier, the DC voltage can change its polarity. The resultant phase controlled converter can work as an AC/DC rectifier or DC/AC inverter (two-quadrant converter).

Figure 22:
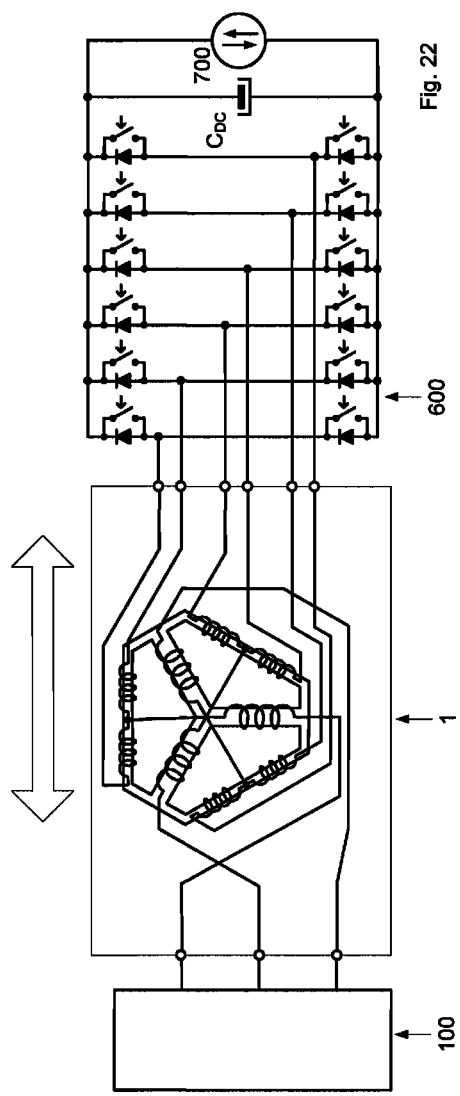

According to an independent aspect of the invention, as indicated by the arrow above the device 1, in both FIGS. 21 and 22, the power flow between the AC and the DC part in a converter can be bidirectional. The reference 700 in fact indicates both power load and source. In such a case each of the diode of the 12-pulse rectifier has controlled switches in parallel, to form a bidirectional front-end.

It can be advantageously used for a motor of a train, an electric vehicle or a lift with a regenerative brake: some of kinetic energy of a vehicle and/or potential energy (due to elevation) can be converted into a useful form of energy instead of dissipating it as heat as with a conventional brake and the converted energy can be fed back into a power grid for use by other vehicles.

The low harmonics bidirectional front-end comprises
a three-phase power line 100
a harmonic cancelling interphase magnetic device 1 according the embodiment of FIGS. 11 to 16C (hexagonal shape)
a 12-pulse rectifier in which each diode has controlled switches in parallel
a power source or load (700).

In this case, as discussed, an additional inductor 400 is not requested.

In another embodiment, when a magnetic device according to 9A to 9D (rectangular shape and five legs) or according to FIGS. 10A to 10D (star-shaped section and four legs) is used, the low harmonics bidirectional front-end magnetic device 1 further comprises an inductor 400.

The invention claimed is:

1. A harmonic cancelling interphase magnetic device comprising
   a magnetic core,
   three power inputs connectable to a three phase power grid
   at least two power outputs for each power inputs, said power outputs being galvanically connected to said three power inputs and connectable to a load,
   wherein when said device is connected between the three phase power grid and the load, the fundamental components of the split current flowing in each of said at least two power outputs are phase shifted of a predetermined angle respect to the fundamental component of the common current flowing in said power input
   wherein said magnetic core is connected.

2. The harmonic cancelling interphase magnetic device of claim 1, wherein said magnetic core has a rectangular shape and comprises three wound legs and two non-wound legs, wherein the cross-section of said non-wound legs is thinner than the cross-section of said wound legs.

3. The harmonic cancelling interphase magnetic device of claim 2, wherein the cross-section of said non-wound legs is half of the cross-section of said wound legs.

4. The harmonic cancelling interphase magnetic device of claim 1 wherein said magnetic core comprises three delta wound legs and three stars wound legs.

5. The harmonic cancelling interphase magnetic device of claim 1, wherein the cross-section of said stars wound legs is twice as the cross-section of said delta wound legs.

6. The harmonic cancelling interphase magnetic device of claim 5, wherein said magnetic core has a triangular shape.

7. The harmonic cancelling interphase magnetic device of claim 5, wherein said magnetic core has a hexagonal shape.

8. The harmonic cancelling interphase magnetic device of claim 5, wherein said star wound legs form a Y-shaped magnetic core part contained in said hexagonal shape of said magnetic core.

9. The harmonic cancelling interphase magnetic device of claim 1, wherein each of said delta wound legs comprises one or two windings and each of said star wound leg comprises one winding.

10. The harmonic cancelling interphase magnetic device of claim 1, wherein said magnetic core has a star-shaped section and comprises three wound legs and one central non-wound leg, wherein the cross-section of said non-wound leg is the same than the cross-section of said wound legs.

11. The harmonic cancelling interphase magnetic device of claim 1, wherein said magnetic core is a laminated iron or ferromagnetic core.

12. The harmonic cancelling interphase magnetic device of claim 1, wherein the number of power outputs for each power input is equal to two and wherein the value of said predetermined angle is equal to 15° for one of said outputs and −15° for the other one of said outputs.

13. The harmonic cancelling interphase magnetic device of claim 1, wherein when said device is connected between the three phase power grid and the load, the fundamental components of the common currents flowing in each of said at least two power outputs for each power input have the same amplitude.

14. Use of the harmonic cancelling interphase magnetic device of claim 1 in an AC/DC power converter including
a power grid,
a 12-pulse rectifier,
a capacitor,
a generic load.

15. Use of the harmonic cancelling interphase magnetic device of claim 1 in an AC/DC power converter including
a power grid,
an inductor,
a 12-pulse rectifier,
a capacitor,
a generic load.

16. Use of the harmonic cancelling interphase magnetic device of claim 1 in a DC/AC power converter including 12-controlled switches.

17. A low harmonics bidirectional front-end comprising
a three-phase power line
a harmonic cancelling interphase magnetic device according to claim 1
a 12-pulse rectifier in which each diode has controlled switches in parallel
a power source or load.

18. The low harmonics bidirectional front-end of claim 17, wherein harmonic cancelling interphase magnetic device is according to claim 8 and further comprising an inductor.

* * * * *